3,784,479
FOAM CONTROL COMPOSITION
Joseph W. Keil, Midland, Mich., assignor to Dow Corning Corporation, Midland, Mich.
No Drawing. Filed May 15, 1972, Ser. No. 253,617
Int. Cl. B01d 17/00
U.S. Cl. 252—358                8 Claims

ABSTRACT OF THE DISCLOSURE

A composition for controlling foam is disclosed which comprises a base oil of polyoxypropylene polymers, polyoxypropylene-polyoxyethylene copolymers or siloxane glycol copolymers, a foam control agent comprising a liquid polydimethylsiloxane, 88–95 parts by weight, and 0.1–10 percent by weight of a siloxane copolymer dispersing agent. Silica may also be present.

---

The use of various silicone containing compositions as antifoamers or defoamers is well known. However, the usefulness of any particular composition as a foam control agent is difficult at best to predict. Consequently compositions developed to control foams generally find use in specific applications and/or situations for which they have been developed. One of the major problems encountered in using foam control agents has been the inability to introduce the diluted foam control agent, which is relatively expensive, into the system which exhibits foaming problems because of their incompatibility with otherwise desirable diluents. To overcome this most manufacturers have developed water based emulsions of their silicone foam control agent even though the emulsification of the foam control agents detracts substantially from their effectiveness in controlling foam.

It has been found in accordance with this invention that the aforementioned problem can be alleviated with the composition of this invention which consists essentially of (1) a base oil or diluent, (2) a foam control agent, and (3) a dispersing agent.

The first component of the composition is a base oil which can be a polyoxypropylene polymer or a polyoxypropylene-polyoxyethylene copolymer. These polymers are commercially available from many sources and are characterized as polymers of $\{CH_2CH(CH_3)O\}$ units or such units copolymerized with $(CH_2CH_2O)$ units. The polymers may be terminated with methyl, ethyl or propyl groups, for example, or they may be terminated with hydroxyl groups. The terminal groups are not known to be critical for the purposes of this invention. It is noted, however, that the commercially available products commonly are hydroxyl terminated and are referred to by those skilled in the art by the misnomers "polypropylene glycols" or "polypropylene-polyethylene glycols" regardless of whether they are monols, diols, triols or polyols. It has been found that such polymers having molecular weights in the range of 500 to 6000 are useful in the composition of this invention.

The base oil can also be a siloxane glycol copolymer having the general formulae (a) $R_aSi\{(OSiMe_2)_n(OSiMeG)_bOSiMe_2G\}_{4-a}$,
(b) $R_aSi\{(OSiMe_2)_n(OSiMeG)_cOSiMe_3\}_{4-a}$,
(c) $GMe_2Si(OSiMe_2)_n(OSiMeG)_bOSiMe_2G$, and
(d) $Me_3Si(OSiMe_2)_n(OSiMeG)_cOSiMe_3$ in which formulae R is a hydrocarbon radical free of aliphatic unsaturation and contains from 1 to 10 carbon atoms Me is a methyl radical, G is a radical of the structure $-D(OR')_mA$ wherein D is an alkylene radical containing from 1 to 30 carbon atoms, R' is an alkylene radical containing from 2 to 10 carbon atoms, m has a value of at least 1, and A is a capping group, $a$ has a value of 0 or 1, $n$ has a value of at least 1, $b$ has a value of 0 to 50, and $c$ has a value of 1 to 50.

In the above formulae R can be any hydrocarbon radical free of aliphatic unsaturation which contains from 1 to 10 carbon atoms such as a methyl, ethyl, propyl, isopropyl, butyl, hexyl, decyl, phenyl, tolyl, benzyl, xylyl, methylcyclohexyl, cyclohexyl, cyclopentyl, $\beta$-phenylpropyl or a $\beta$-phenylethyl radical.

Specific examples of alkylene radical D which links the glycol portion of G to the silicon atom are the methylene, ethylene, propylene, isopropylene, butylene, octylene, decylene, octadecylene and the myricylene radicals. Preferably D contains from 1 to 16 carbon atoms.

R' in the above formula is any alkylene radical containing from 2 to 10 carbon atoms. Thus R' can be an ethylene, propylene, isopropylene, butylene, hexylene, octylene or a decylene radical. Most preferably R' contains from 2 to 4 carbon atoms. It is noted that R' can be derived from a single glycol or a combination of glycols. That is to say, for example, OR' can be ethylene oxide units, propylene oxide units or butylene oxide units only, or OR' can be combinations of such units.

The symbol $m$ which defines the number of OR' units in the glycol portion of the molecule can have a value as low as 1 and can range up to 1000 or more. Generally, $m$ will have an average value in the range of 10 to 100.

The glycol or polyoxyalkylene unit is terminated or capped by the A group. The specific nature of this group is not known to be critical for purposes of this invention. Thus the glycol can be capped by a hydroxyl group (A is a hydrogen atom), by an ether group (A is a monovalent hydrocarbon radical such as a methyl, butyl, vinyl or phenyl radical), by a carboxyl radical, by the salt or ester of a carboxyl radical, by a carbonate ester group, or by an isocyanate group.

The symbol $n$ which defines the number of dimethylsiloxane units in the molecules can have a value of at least 1 and can range up to 1500 or more. It is believed that the number of dimethylsiloxane units in the molecule in relationship to the glycol containing G units should be at least 10:1 for the most satisfactory results to be obtained. The upper ratio of OSiMe₂ units to G containing units can be 50:1 or more.

The siloxane glycol copolymers useful as base oils herein are well known commercially available materials. For those unfamiliar with these compounds attention is directed to U.S. Pats. 3,402,192; 3,518,288; and 3,637,783 for illustrative descriptions of their preparations and other details. The entire disclosures of the foregoing patents are incorporated herein by reference.

The base oil can constitute from 70 to 98.9 percent by weight of the composition. The base oil can be made up of a polyoxypropylene polymer per se, a polyoxypropylene-polyoxyethylene copolymer per se, a siloxane glycol copolymer per se, or a mixture of any of these. The particular base oil used will depend on the particular nature of the system in which it is desired to control the foam.

The second component of the composition is the foam control agent. This agent can constitute from 1 to 20 percent by weight of the composition. The foam control agent consists essentially of from 88 to 95 parts by weight of a liquid polydimethylsiloxane having a viscosity of at least 20 centistokes at 25° C., from 5 to 10 parts by weight of silica, and from 0 to 2 parts by weight of a siloxane resin composed of $(CH_3)_3SiO_{1/2}$ units and $SiO_2$ units in which resin the ratio of $(CH_3)_3SiO_{1/2}$ units to the $SiO_2$ units is within the range of from 0.4:1 to 1.2:1.

The liquid polydimethylsiloxanes are well known articles of commerce available from numerous sources. They can be prepared by various techniques such as the hydrolysis and subsequent condensation of dimethyldihalosilanes, or by the cracking and subsequent condensation of dimethylcyclosilanes. The particular endblocking groups on the polydimethylsiloxane is not critical. Generally speaking, the commercially available materials are trimethylsilyl or hydroxyl endblocked, but other endblocked materials would work equally well. To obtain significant antifoam or defoam performance the viscosity of the polydimethylsiloxane must be at least 20 centistokes at 25° C. The upper viscosity limit of this component is not critical and can range up to 1,000,000 centistokes or more. Best results are believed to be obtained when the viscosity of the polydimethylsiloxane is in the range of 20 to 2000 centistokes at 25° C.

The siloxane resin employed in the composition is also a standard article of commerce available from various sources. It can be prepared by the cohydrolysis and condensation of $(CH_3)_3SiCl$ and $SiCl_4$ or by reacting $$(CH_3)_3SiCl$$

with an acidic silica sol. Its preparation is detailed in a host of places in the literature and therefore, will not be set forth again here. While the presence of the siloxane resin in the foam control agent is not required, for many applications it enhances the overall performance of the product.

A silica aerogel is one kind to employ in the composition. Briefly, such materials are prepared by displacing water from a silica hydrogel with a low boiling organic liquid such as ethyl alcohol, heating the treated gel in an autoclave to approximately the critical temperature of the organic liquid, and then releasing the vapors of the organic liquid from the autoclave whereby excessive shrinking or crushing of the cellular structure of the silica is avoided. The details of this technique are described in the literature and silica aerogels are commercially available. Other silicas such as precipitated silicas, silica xerogels, fume silicas, and treated silicas which have organosilyl groups on their surface can also be employed. These and other silicas which can be employed herein are well known and will be obvious to those skilled in the art.

The third essential component of the composition of this invention is characterized as a "dispersing agent" for want of a better term. The function of this component is to keep the foam control agent (2) dispersed in base oil (1). Two types of siloxane copolymers have been found which will serve this purpose. One of these copolymers consists essentially of $SiO_2$ units, $(CH_3)_3SiO_{1/2}$ units and $Q(CH_3)_2SiO_{1/2}$ units wherein Q is a polyoxypropylene polymer or a polyoxypropylene-polyoxyethylene copolymer radical having molecular weights in the range of 500 to 6000, Q being attached to the silicon atom via a silicon-carbon bond, and the ratio of the $SiO_2$ units to the total $(CH_3)_3SiO_{1/2}$ and $Q(CH_3)_2SiO_{1/2}$ units is in the range of 1:0.4 to 1:1.2. The other known operable copolymer is the reaction product obtained by heating a mixture of a siloxane copolymer consisting essentially of $SiO_2$ units and $(CH_3)_3SiO_{1/2}$ units in which the ratio of the $SiO_2$ units to the $(CH_3)_3SiO_{1/2}$ units is in the range of 1:0.4 to 1:1.2, and a hydroxyl containing polyoxypropylene polymer or a hydroxyl containing polyoxypropylene-polyoxyethylene copolymer having molecular weights in the range of 500 to 6000.

The first copolymer is best prepared by cohydrolyzing and condensing a mixture of $(CH_3)_3SiCl$, $H(CH_3)_2SiCl$ and $SiCl_4$ and then coupling an allyloxy ended polyoxyalkylene polymer thereto with the aid of a platinum catalyst. For those unfamiliar with this preparation attention is directed to U.S. Pat. 3,511,788, particularly Examples 5 and 6, for details. The entire disclosure of this patent is incorporated herein by reference.

The second copolymer, which is preferred, is made simply by heating a mixture of the two ingredients for about two hours at reflux, preferably in the presence of a siloxane condensation catalyst such as potassium hydroxide or tin octoate. In this case it is theorized that the residual hydroxyl groups on the silicon atoms in the siloxane condense with the hydroxy groups of the polyoxyalkylene polymer to form a silicon-oxygen-carbon bond between the two reactants.

Component (3) as prepared generally contains a solvent such as xylene or toluene. This component can be used as prepared or the solvent can be removed from the product before incorporation into the composition. Either way no difference in performance is known to occur. If the solvent is not removed before adding this component, one less processing step is involved and the final product is more economically produced. The composition of this invention can contain, therefore, from 0 to 10 percent by weight of a solvent.

The composition of this invention is prepared by simply mixing the three components together in the correct proportions. So far as is known at this time there is no particular order in which the components should or need be mixed.

The amount of the composition of this invention which is employed will depend on the particular system in which foam is to be controlled and the extent to which the user wishes to control the foam. Thus the amounts will vary depending on whether one is using the composition in an alkaline soap solution, evaporation of alkaline paper black liquor, concentration of synthetic rubber latices, steam distillation of styrene-butadiene emulsions, refining sugar, dyeing textiles, treating sewage for disposal, or something else. The compositions of this invention can be used as any kind of foam control agents, i.e., as defoaming agents and/or antifoaming agents. Defoaming agents are generally considered as foam reducers whereas antifoaming agents are generally considered as foam preventors. As noted, the instant compositions can serve in either or both capacities.

Now in order that those skilled in the art may better understand how the present invention can be practiced, the following examples are given by way of illustration and not by way of limitation. All parts and percents referred to herein are by weight, and all viscosities measured at 25° C., unless otherwise specified.

EXAMPLE 1

A composition was prepared by thoroughly mixing 8 g. of a foam control agent consisting essentially of about 88% of a liquid polydimethylsiloxane having a viscosity of 1000 cs. at 25° C., about 10% of precipitated silica and about 2% of a 75% (solids) xylene solution of a siloxane resin consisting essentially of $SiO_2$ units and $(CH_3)_3SiO_{1/2}$ units wherein the ratio of the $SiO_2$ units to the $(CH_3)_3SiO_{1/2}$ units is in the range of 1:0.4 to 1:1.2, and 2 g. of a reaction product derived by heating for 30 minutes at reflux a mixture of 100 g. of a 50% (solids) xylene solution of a siloxane copolymer consisting essentially of $SiO_2$ units and $(CH_3)_3SiO_{1/2}$ units in which the ratio of the $SiO_2$ units to the $(CH_3)_3SiO_{1/2}$ units is in the range of 1:0.4 to 1:1.2, 100 g. of xylene, 200 g. of a polyoxypropylene-polyoxyethylene triol polymer having a molecular weight of about 2600 (Dow Polyglycol 15–200) in xylene, and 14 drops of a 1 N alcoholic KOH solution.

2 g. of the above prepared composition and 50 g. of the Dow Polyglycol 15–200 were thoroughly mixed using an Eppenbach mixer. This composition and a 50% solids dilution of it in water were evaluated as antifoams.

The evaluation was conducted by means of a "shake test." In this test 100 ml. of a 1% anionic surfactant (Tide) solution in water is placed in a 8 oz. wide mouth round glass bottle. A line is marked on the bottle 2 inches above the surface of the liquid. The composition to be tested is added to the bottle, the bottle capped, the mixture shaken by hand for 10 seconds, and then the percent of foam determined. If the foam height is 1 inch above the surface of the liquid the amount of foam is 50%, if it is 2 inches above the surface of the liquid the amount of foam is 100%, and so on. The bottle is then allowed to stand and the time (in seconds) for the foam to disappear is noted. If the foam does not disappear in 60 seconds or less the remaining foam height is reported as percent as measured at 60 seconds. In this example the surfactant solution was heated in the range of 90° to 100° C. for conducting the test. The test results are set forth in the table below.

| Test composition | Shake test | | |
| --- | --- | --- | --- |
| | Amount (drops) | Percent foam | Break time | Percent foam remaining |
| Dow Polyglycol 15-200 [1] | 1 | 80 | 60 | 80 |
| Do | 5 | 60 | 60 | 60 |
| Composition as prepared | 1 | 30 | 60 | 10 |
| Do | 2 | 20 | 50 | 0 |
| 50% solids composition | 2 | 20 | 60 | 10 |
| Do | 4 | 10 | 24 | 0 |

[1] Included for comparison.

A composition was prepared for purposes of comparison which was identical to the one above except that it did not contain the reaction product. Samples of both compositions were placed in vials and the vials placed in a 100° C. oven. The vials were checked after 4 hours and after 24 hours to see if any separation had occurred. No change was observed at either time in the composition containing the reaction product. Separation in the form of a clear oil at the top was observed at both times in the composition without the presence of the reaction product.

EXAMPLE 2

A premix was prepared which consisted of 430 g. of the foam control agent of Example 1 and 70 g. of a 50% (solids) solution in xylene of a reaction product as in Example 1 except that 1 part of the siloxane copolymer was reacted with 2 parts of a hydroxylated polyoxypropylene polymer having a molecular weight of about 4100 (Voranol CP4100) and the reflux time was one hour. Various compositions were then prepared with the premix and base oils as set out below.

Composition 1 consisted essentially of 100 g. of a polyoxypropylene glycol polymer having a molecular weight of about 4000 and 5 g. of the premix. This composition was Eppenbached for 1 minute at a Variac setting of 60 and then for 30 seconds at a setting of 100.

Composition 2 was identical to the first only it contained 2 g. of the premix.

Composition 3 was identical to the first only it was mixed with a Lightning mixer.

Composition 4 was identical to the first only four times as much (400 g. and 20 g., respectively) of the two components was employed, and the composition was colloid milled at a setting of 0.015 inch.

Composition 5 was identical to the first except that a polyoxypropylene glycol polymer having a molecular weight of 6000 (LHT 28) was used in place of the glycol polymer.

Composition 6 was identical to the first except that a 2000 molecular weight glycol polymer was used.

Composition 7 consisted of a 10% solids aqueous emulsion of the foam control agent used to make the premix and was included for comparison.

The above compositions were evaluated in an anti-foam pump test. This test makes use of a motor driven pump (Eastern Industries Model B-1: style CZZ-71-ZV) which continually recirculates the foaming system. The foaming system is pumped into a stainless steel cylinder 7 inches high with a 5 inch diameter (2000 ml. capacity) where foam height is measured. The antifoam is subjected to high amounts of agitation, emulsification, and shear in the test apparatus. In this test 1000 ml. of a 1% Triton X-100 (isooctyl phenyl polyethoxy ethanol) solution in water at room temperature is placed in the pump test vessel. Lines are marked on the inside of the cylinder at levels of 1, 2 and 3 inches above the surface of the liquid. A number of drops of the composition being evaluated is added to the surfactant solution in the pump tester. The pump is then turned on and the time (in seconds) noted for the foam to reach the 1, 2 and 3 inch levels marked on the cylinder. The three times are then totaled to obtain a single value.

The results of the evaluation are set forth in the table below.

| | Percent silicone | Amount | | Time (seconds) to reach foam height of— | | | Total (seconds) |
| --- | --- | --- | --- | --- | --- | --- | --- |
| | | Drops | P.p.m. | 1 inch | 2 inches | 3 inches | |
| Composition: | | | | | | | |
| 1 | 4.8 | 5 | 140 | 7 | 30 | 69 | 106 |
| 1 | 4.8 | 9 | 250 | 14 | 55 | 100 | 169 |
| 1 | 4.8 | 18 | 500 | 19 | 100 | 160 | 279 |
| 2 | 2.0 | 5 | 140 | 6 | 24 | 45 | 75 |
| 2 | 2.0 | 9 | 250 | 7 | 30 | 65 | 102 |
| 2 | 2.0 | 18 | 500 | 12 | 55 | 100 | 162 |
| 3 | 4.8 | 9 | 250 | 11 | 45 | 85 | 145 |
| 4 | 4.8 | 9 | 250 | 14 | 54 | 90 | 158 |
| 5 | 4.8 | 9 | 250 | 14 | 50 | 88 | 154 |
| 6 | 4.8 | 10 | 250 | 15 | 31 | 50 | 96 |
| 7 | 10 | 25 | 1,000 | 8 | 41 | 72 | 121 |

The above compositions were also evaluated in the shake test described in Example 1 except that a 70° C. temperature was used and the activity after standing for 1 and 3 days at 70° C. was also checked. These test results are set out in the following table.

| | Amount | | Shake test (percent foam/ break time) | | |
| --- | --- | --- | --- | --- | --- |
| | Drops | p.p.m. | Original | 1 day | 3 days |
| Composition: | | | | | |
| 1 | 1 | 280 | 40/6 | 70/89 | |
| 1 | 2 | 560 | 25/1 | 30/9 | 50/73 |
| 1 | 5 | 1,400 | 10/0 | 20/1 | 20/1 |
| 2 | 1 | 280 | 50/105 | 70/900 | |
| 2 | 2 | 560 | 40/3 | 40/14 | 50/12 |
| 2 | 5 | 1,400 | 10/1 | 25/1 | 40/15 |
| 3 | 1 | 280 | 40/8 | 50/36 | 75/1,800 |
| 3 | 2 | 560 | 25/1 | 20/2 | 30/2 |
| 3 | 5 | 1,400 | 10/0 | 20/1 | 20/1 |
| 5 | 1 | 280 | 40/8 | 50/72 | |
| 5 | 2 | 560 | 20/2 | 40/7 | 40/20 |
| 5 | 5 | 1,400 | 10/0 | 20/1 | 20/1 |
| 6 | 1 | 250 | 40/40 | 50/30 | 70/360 |
| 6 | 2 | 500 | 30/7 | 30/3 | 40/6 |
| 6 | 5 | 1,250 | 15/2 | 30/2 | 30/1 |
| 7 | 1 | 400 | 20/11 | 70/87 | |
| 7 | 2 | 800 | 60/3 | 50/12 | 60/12 |
| 7 | 5 | 2,000 | 30/1 | 50/2 | 50/2 |

EXAMPLE 3

A composition was prepared which consisted essentially of (A) 9 parts of a composition which consisted essentially of 92% of a siloxane glycol copolymer of the formula

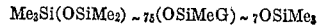

wherein G is

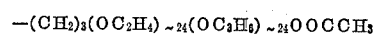

5% of a 50% solids xylene solution of a siloxane copolymer which is the reaction product derived from heating a mixture of 1 part of a siloxane copolymer composed of SiO$_2$ units and (CH$_3$)$_3$SiO$_{1/2}$ units wherein the ratio of the SiO$_2$ units to the (CH$_3$)$_3$SiO$_{1/2}$ units is in the range of 1:04 to 1:1.2, and 2 parts of a hydroxylated polyoxypropylene polymer having a molecular weight of about 4100 (Voranol CP4100), 1% of the foam control agent of Example 1, and 2% of a siloxane glycol copolymer of the formula

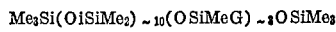

wherein G is

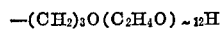

(B) 0.6 part of a hydroxylated polyoxypropylene polymer having a molecular weight of about 4100, and (C) 0.2 part of a premix consisting essentially of 86% of the foam control agent of Example 1 and 14% of the siloxane copolymer reaction product used in part (A).

A second composition was prepared which was similar to the one above except that 5 parts of (A), 4 parts of (B), and 1 part (C) were mixed.

In the shake test at 200 p.p.m. concentration the first composition gave 55% foam after 10 seconds, and 60% foam after 40 seconds whereas the second composition gave 30% foam after 10 seconds and 50% foam after 40 seconds.

The above compositions were also evaluated in the antifoam pump test described in Example 2 with the following modifications. A 0.1% Tween 80 (polyoxyethylene sorbitan monooleate) solution was substituted for the Triton X–100 solution, a heating mantel was placed at the bottom of the cylinder to control the temperature, the antifoam compositions were diluted to 10% solids with cold water for evaluation, the surfactant solution was heated in the pump test vessel to 150° F. before the antifoam composition was added, and then heated to 190 F. before turning the pump on. After the pump had run 2 minutes the foam height was recorded. The above compositions gave foam heights of 1½ and 1¼ inches, respectively, and only very slight separation of the antifoam components was noted in both.

When the siloxane glycol copolymer of the formula

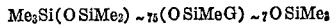

wherein G is

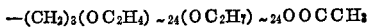

is evaluated per se in the hot antifoam pump test above, the foam height is less than 2 inches after two minutes but it separates from the bath on addition and plates out in the cylinder.

EXAMPLE 4

A composition was prepared by mixing 8.6 g. of the foam control agent of Example 1 and 1.4 g. of a reaction product as used in Example 2 except that 1 part of siloxane copolymer per 1 part of a 4100 molecular weight polyoxypropylene-polyoxyethylene polymer was used to make the reaction product.

5 g. of the above prepared composition and 70.2 g. of a polyoxypropylene glycol of 4000 molecular weight were thoroughly mixed in an Eppenbach mixer. Five drops of this composition were evaluated as an antifoam in the pump test as described in Example 2. The foam reached the 1", 2", and 3" levels after a time lapse of 9, 25 and 75 seconds, respectively. The total of these figures is 109.

A second composition was prepared for purposes of comparison which consisted essentially of 70.2 g. of a polyoxypropylene glycol of 4000 molecular weight and 5 g. of the foam control agent of Example 1. This composition was thoroughly mixed in an Eppenbach. Five drops of this composition were evaluated as an antifoam in the pump test as described in Example 2. The foam reached the 1", 2" and 3" levels after a time lapse of 5, 25 and 53 seconds, respectively. The total of these figures is 83.

EXAMPLE 5

A composition (designated A) was prepared by mixing 51.6 g. of the foam control agent of Example 1 and 8.4 g. of the reaction product used in Example 2.

5 g. of the above prepared composition and 70.2 g. of a polyoxypropylene glycol of 4000 molecular weight were thoroughly mixed in an Eppenbach mixer.

A second composition (designated B) was prepared for purposes of comparison which consisted essentially of 70.2 g. of the polyoxypropylene glycol of 4000 molecular weight and 5 g. of the foam control agent of Example 1. This composition was thoroughly mixed in an Eppenbach.

The above compositions were evaluated as antifoams in the pump test as described in Example 2. They were evaluated when prepared and after having shelf aged for 2 months. Samples of the aged compositions were taken from the top and bottom of the bottles to see if significant separation or settling had occurred. Five drops of the composition was used in all tests. The test results are set forth in the table below.

| Composition: | Time (seconds) to reach foam height of— | | | |
| | 1 inches | 2 inches | 3 inches | Total (seconds) |
| --- | --- | --- | --- | --- |
| A | 7 | 32 | 63 | 102 |
| B | 5 | 27 | 57 | 89 |
| A [1] | 8 | 34 | 65 | 107 |
| B [1] | 3 | 17 | 34 | 54 |
| A [2] | 7 | 35 | 70 | 112 |
| B [2] | 9 | 45 | 75 | 129 |

[1] Aged sample, top.
[2] Aged sample, bottom.

That which is claimed is:

1. A composition which consists essentially of
(1) 70 to 98.9 percent by weight of a base oil selected from the group consisting of polyoxypropylene polymers and polyoxypropylene-polyoxyethylene copolymers having molecular weights in the range of 500 to 6000, and siloxane glycol copolymers having the general formulae
   (a) $R_aSi\{(OSiMe_2)_n(OSiMeG)_bOSiMe_2G\}_{4-a}$,
   (b) $R_aSi\{(OSiMe_2)_n(OSiMeG)_cOSiMe_3\}_{4-a}$,
   (c) $GMe_2Si(OSiMe_2)_n(OSiMeG)_bOSiMe_2G$, and
   (d) $Me_3Si(OSiMe_2)_n(OSiMeG)_cOSiMe_3$
   in which formulae
   R is a hydrocarbon radical free of aliphatic unsaturation and contains from 1 to 10 carbon atoms,
   Me is a methyl radical,
   G is a radical of the structure —D(OR')$_m$A wherein
      D is an alkylene radical containing from 1 to 30 carbon atoms,
      R' is an alkylene radical containing from 2 to 10 carbon atoms,
      m has a value of at least 1, and
      A is a capping group,
   a has a value of 0 or 1,
   n has a value of at least 12,
   b has a value of 0 to 50, and
   c has a value of 1 to 50,
(2) 1 to 20 percent by weight of a foam control agent which consists essentially of 88 to 95 parts by weight of a liquid polydimethylsiloxane having a viscosity of at least 20 centistokes at 25° C., 5 to 10 parts by weight of silica, and 0 to 2 parts by weight of a siloxane resin consisting essentially of SiO$_2$ units and (CH$_3$)$_3$SiO$_{1/2}$ units the ratio of the SiO$_2$ units to the (CH$_3$)$_3$SiO$_{1/2}$ units being in the range of 1:0.4 to 1:1.2, and
(3) 0.1 to 10 percent by weight of a dispersing agent which maintains (2) dispersed in (1) and which is a siloxane copolymer selected from the group consisting of (i) copolymers consisting essentially of $SiO_2$ units, $(CH_3)_3SiO_{1/2}$ units and $Q(CH_3)_2SiO_{1/2}$ units wherein Q is a polyoxypropylene polymer or a polyoxypropylene - polyoxyethylene copolymer radical having a molecular weight in the range of 500 to 6000, Q being attached to the silicon atom via a silicon-carbon bond, the ratio of the $SiO_2$ units to the total $(CH_3)_3SiO_{1/2}$ and $$Q(CH_3)_2SiO_{1/2}$$

units being in the range of 1:0.4 to 1:1.2, and (ii) copolymers which are the reaction products derived from heating a mixture of a siloxane copolymer consisting essentially of $SiO_2$ units and $(CH_3)_3SiO_{1/2}$ units in which the ratio of the $SiO_2$ units to the $(CH_3)_3SiO_{1/2}$ units is in the range of 1:0.4 to 1:1.2, and a hydroxylated polyoxypropylene polymer or a hydroxylated polyoxypropylene-polyoxyethylene copolymer having molecular weights in the range of 500 to 6000.

2. A composition as defined in claim 1 wherein (1) is a polyoxypropylene polymer, in (2) the liquid polydimethylsiloxane has a viscosity in the range of 20 to 2000 centistokes and the silica is a precipitated silica, and (3) is a reaction product (ii).

3. A composition as defined in claim 1 wherein (1) is a mixture of a polyoxypropylene polymer and a siloxane glycol copolymer (d), in (2) the liquid polydimethylsiloxane has a viscosity in the range of 20 to 2000 centistokes and the silica is a precipitated silica, and (3) is a reaction product (ii).

4. A composition as defined in claim 2 which contains from 0 to 10 percent by weight of a solvent.

5. A composition as defined in claim 3 which contains from 0 to 10 percent by weight of a solvent.

6. A composition as defined in claim 3 wherein the siloxane glycol copolymer (d) has the general formula $$MeSi(OSiMe_2)_{\sim 75}(OSiMeG)_{\sim 7}OSiMe_3$$

wherein G is $$-(CH_2)_3(OC_2H_4)_{\sim 24}(OC_3H_6)_{\sim 24}OOCCH_3$$

7. In a process of controlling foam which includes the addition of a foam control agent to the system in which the foaming is to be controlled, the improvement comprising using the composition of claim 1 as the foam control agent.

8. In a process of controlling foam which includes the addition of a foam control agent to the system in which the foaming is to be controlled, the improvement comprising using the composition of claim 3 as the foam control agent.

References Cited

UNITED STATES PATENTS 3,383,327   5/1968   Sullivan _____ 252—358
3,455,839   7/1969   Rauner _____ 252—321

JOHN D. WELSH, Primary Examiner

U.S. Cl. X.R.

252—321

UNITED STATES PATENT AND TRADEMARK OFFICE
CERTIFICATE OF CORRECTION

PATENT NO. : 3,784,479
DATED : January 8, 1974
INVENTOR(S) : Joseph W. Keil

It is certified that error appears in the above-identified patent and that said Letters Patent are hereby corrected as shown below:

Column 1, lines 11-17, substitute the following paragraph,

--A composition for controlling foam is disclosed which comprises (1) a base oil of polyoxypropylene polymers, polyoxypropylene-polyoxyethylene copolymers or siloxane glycol copolymers, (2) a foam control agent comprising a liquid polydimethylsiloxane, silica, and optionally a siloxane resin, and (3) a siloxane copolymer dispersing agent.--

Column 3, line 2, "dimethylcyclosilanes" should read --dimethylcyclosiloxane--.

Column 8, line 60, "12" should read --1--.

Column 9, line 2, "$CH_3)_3SiO_{1/2}$" should read --$(CH_3)_3SiO_{1/2}$--.

Column 10, line 7 the formula "$MeSi(OSiMe_2)_{\sim 75}(OSiMeG)_{\sim 7}OSiMe_3$" should read --$Me_3Si(OSiMe_2)_{\sim 75}(OSiMeG)_{\sim 7}OSiMe_3$--.

Signed and Sealed this

Twenty-sixth Day of October 1976

[SEAL]

Attest:

RUTH C. MASON
Attesting Officer

C. MARSHALL DANN
Commissioner of Patents and Trademarks